Feb. 28, 1928.
E. J. RHOADES
DIRECTION SIGNAL
Filed March 7, 1927
1,660,722
2 Sheets-Sheet 1
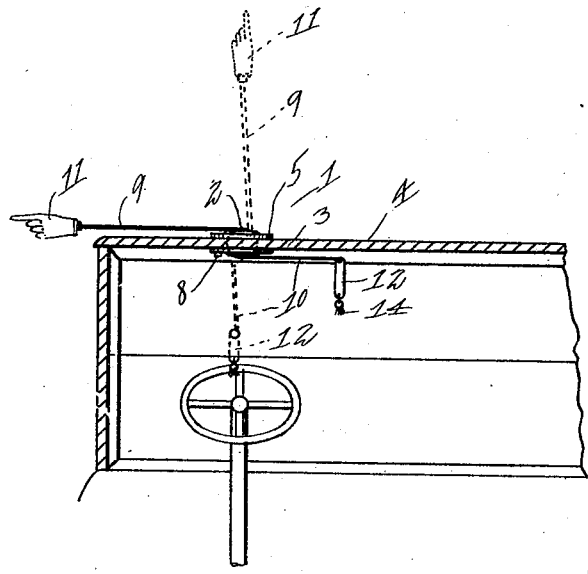
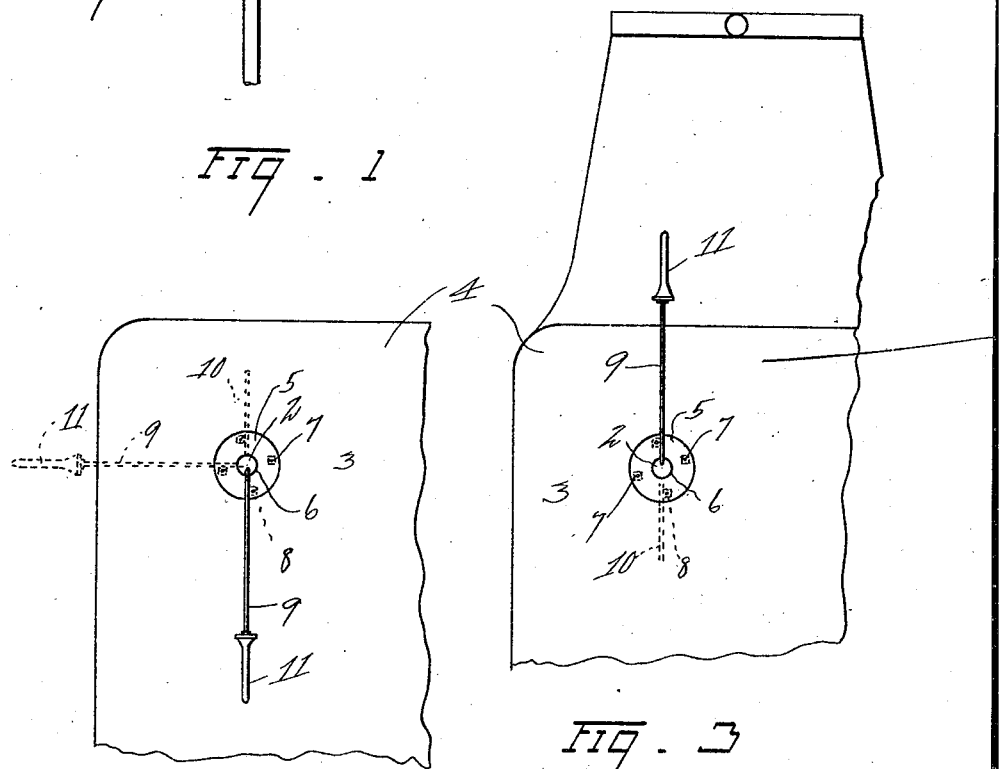
INVENTOR
Emery J. Rhoades
BY
ATTORNEY

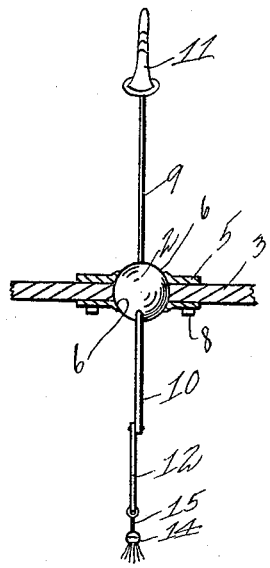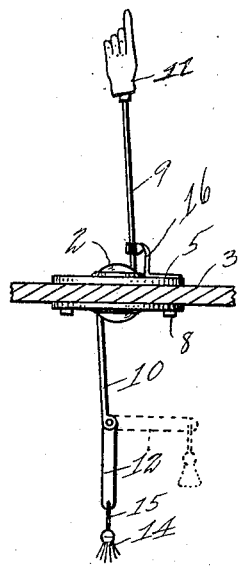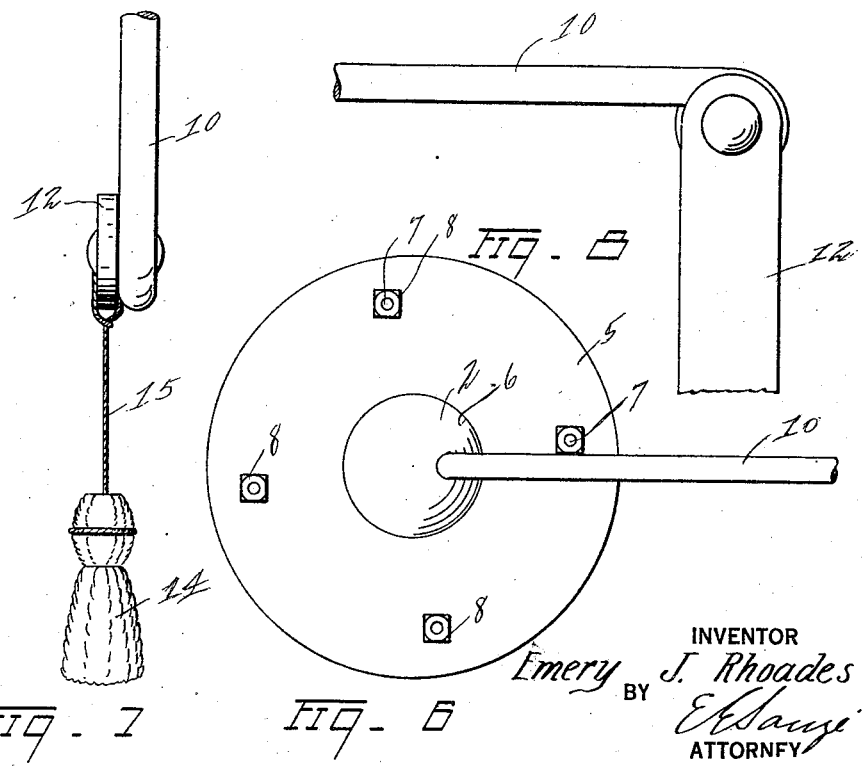

Patented Feb. 28, 1928.

1,660,722

UNITED STATES PATENT OFFICE.

EMORY J. RHOADES, OF WALLA WALLA, WASHINGTON.

DIRECTION SIGNAL.

Application filed March 7, 1927. Serial No. 173,244.

This invention relates to direction signals and has as one of its objects to provide a direction signal that is applicable for use on closed cars, or where it is desired to operate the signal from a more or less remote position.

Another object of the invention is to provide a direction signal that is adapted for movement on and above a horizontal plane.

A further object of the invention is to provide a direction signal having a movable lever handle adapted to facilitate the operation of the signal.

A further object of the invention is to provide a direction signal having a telltale to indicate the position of the handle thereof at all times.

With these and other objects in view reference is now had to the accompanying drawings, in which Fig. 1 is a fragment of the front end of a closed car showing the application of the device;

Fig. 2 is a plan view of a fragment of the top of a car showing the device installed and in the position of rest;

Fig. 3 is a similar view to Fig. 2 showing the indicator hand extended forward;

Fig. 4 shows an edge or vertical position of the indicator hand;

Fig. 5 shows the indicator hand in a vertical and indicating position;

Fig. 6 is a plan view from below of one securing plate;

Fig. 7 is an end view of the lever handle showing the relative position of the telltale therewith; and Fig. 8 is a side elevation of the lever handle and operating lever, showing their hinged connection.

Having reference to the drawings like numerals refer to like parts throughout the several views and the numeral 1 refers to the signaling means in its entirety, and this signaling means comprises members assembled to form a ball and socket joint, the ball 2 thereof being positioned within the supporting means 3, in this case the top 4 of a sedan, the supporting means being cut to fit the ball nicely to act as a friction bearing therefor and thus becoming a part of the joint.

The joint is further secured therein and therewith by securing plates 5 mounted on either side of the support and these plates consist of disks having central orifices 6 of spherical form to engage the ball 2 on either side of the support 3, and the plates are secured to the support by bolts 7, the heads thereof preferably being countersunk to present a smooth surface on the top plate and having the nuts 8 projecting for a purpose to be explained.

It is now obvious that a joint of this construction is adapted to admit of rotary motion in every direction within certain limits.

Attached to and extending in one direction from the ball is an indicator lever 9, and this lever is arranged to extend almost but not quite tangentially (enough so however that it may be termed tangentially) with respect to the ball 2, this positioning of the lever admitting of moving the lever to a relatively vertical position as shown in Fig. 5, by avoiding with this offset, the side wall of the orifice.

Attached in a similar manner, and in a similar but opposite position to the indicator lever, is an operating lever 10.

While the indicator lever operates on one side of the support, the operating lever operates on the other side thereof, and by this arrangement the indicator lever may be operated from the inside of the car, or the other side of the support.

To provide for a correct positioning of the indicator lever the nuts 8 are arranged to form stops and these are positioned slightly off center with respect to the operating lever 10 to permit that member to come to rest in a predetermined position in register against the nuts for engagement therewith when the movement of the indicator lever is completed.

The indicator lever is equipped with an indicating figure, such as a hand 11, and as it is essential that the flat of the hand be presented to the signaled for observance and from the fact that the hand is not within the range of vision of the operator, a lever handle 12 is provided which is pivotally attached to the operating lever and this handle is positioned with respect to the hand so that its flat surface or other indicative mark will be in accordance with the position of the hand.

The lever handle 12 is also adapted to move through various degrees of arc with respect to the operating lever, as shown by the dotted lines in Fig. 5, and thus is adapted to act as a lever to rotate the operating lever 10 thereby to rotate the hand to the desired position.

With the handle arranged to always assume a depending position it becomes readily accessible.

Obviously the lever handle may at times assume many positions and for the purpose of readily locating the handle, as when quick action is necessary, a telltale 13 is provided consisting of a tassel 14, or other similar means, supported from the end of the handle by a flexible connecting means 15. This telltale by its flexibility, and depending position, can be located in the dark as well as in the light by the movement of the hand of the operator in a horizontal plane, and when once located the operator is assured that the lever handle is immediately available.

In use the lever handle is located through the medium of the telltale and the operating lever is moved to register with the respective nut when the indicator hand is in a correct position for signaling.

The indicating lever normally rests on the top of the car, as shown by the solid line in Fig. 2, the dotted lines in prolongation thereof representing the operating lever. To move the indicating lever to a position perpendicular to this normal position, the handle is pulled downward slightly to permit the operating lever to miss the nuts in its rotation, and the operating lever is then seated in its position against said nuts, see Fig. 6.

Now to indicate that the vehicle is going to stop the lever handle is pulled downward until the hand assumes the position shown by the dotted lines in Fig. 1, then to place the signaling means at the place of rest the handle is moved to the position shown dotted in Fig. 5 when the ball may be rotated and the device will assume the position shown in Fig. 4, the hand in this case being still erect but edge on.

Now by forcing the handle forward the hand will again assume the position of rest shown in Fig. 2, as before mentioned and the device will again be in readiness for operation.

Where it is desired to maintain the signal in an erect position a spring clip 16 may be utilized, the clip being secured to one of the plates in any suitable manner, with its spring end positioned to engage the arm 9 in the desired position.

Having thus described my invention, I claim:

1. In a direction signal, a signaling means comprising a ball mounted in a support and secured therein by securing plates mounted on either side of said support, said plates forming with said ball a ball joint, means to secure said plates to said support, said means being positioned, and extended to form stops, a movable indicating lever carrying an indicating hand attached tangentially to and extended from said ball, and normally positioned to lay on one side of said support, and an operating lever attached tangentially to and extending from said ball and normally positioned to lay on the opposite side and in an opposite direction from said indicating lever, and providing an offset engageable by said stops, and a tell tale attached to and depending from said operating lever.

2. In a direction signal, a signaling means comprising a ball mounted in a support and secured therein by securing plates mounted on either side of said support, said plates forming with said ball a ball joint, means to secure said plates to said support, said means being positioned, and extended to form stops, a movable indicating lever carrying an indicating hand attached tangentially to and extended from said ball, and normally positioned to lay on one side of said support, and an operating lever attached tangentially to and extending from said ball normally positioned to lay on the opposite side and in an opposite direction from said indicating lever, and providing an offset engageable by said stops, a lever handle normally depending and pivotally attached to said operating lever, and a tell tale attached to and depending from said lever handle.

3. In a direction signal, the combination of a signaling means comprising a ball mounted in a support and secured therein by securing plates mounted on either side of said support, said plates forming with said ball a ball joint, means to secure said plates to said support, said means being positioned, and extended to form stops, a movable indicating lever carrying an indicating hand attached tangentially to and extended from said ball, and normally positioned to lay on one side of said support, and an operating lever attached tangentially to and extending from said ball and normally positioned to lay on the opposite side and in an opposite direction from said indicating lever, and providing an offset engageable by said stops, a lever handle normally and pivotally attached to said operating lever, and a tell tale attached to and depending from said lever handle.

In testimony whereof I have affixed my signature.

EMORY J. RHOADES.